United States Patent [19]

Palumbo, deceased et al.

[11] 4,082,687
[45] Apr. 4, 1978

[54] MANGANESE ACTIVATED ALKALINE EARTH TUNGSTATE PHOSPHORS AND METHOD OF PREPARING THE SAME

[75] Inventors: Dominic T. Palumbo, deceased, late of Towanda, Pa., by Frances A. Palumbo, administratrix; Francis N. Shaffer, Towanda, Pa.

[73] Assignee: GTE Sylvania Incorporated, Stamford, Conn.

[21] Appl. No.: 805,002

[22] Filed: Jun. 9, 1977

[51] Int. Cl.$^2$ .............................................. C09K 11/38
[52] U.S. Cl. .......................... 252/301.4 F; 252/301.5
[58] Field of Search ...................... 252/301.4 F, 301.5

[56] References Cited

U.S. PATENT DOCUMENTS

| 2,203,682 | 6/1940 | Foulke ............................... 252/301.5 |
| 2,258,472 | 10/1941 | Ruttenauer ......................... 252/301.5 |
| 3,005,125 | 10/1961 | Evans et al. .................. 252/301.5 X |
| 3,940,347 | 2/1976 | Fara et al. .......................... 252/301.5 |

*Primary Examiner*—Jack Cooper
*Attorney, Agent, or Firm*—Donald R. Castle

[57] ABSTRACT

Luminescent materials, having the formula, $M_{(3+x)}WO_{(6+x)}: y$Mn wherein M is an alkaline earth metal selected from the group consisting of calcium, barium and strontium, $x$ has a value of from 0 to about 0.4 and $y$ has a value of from 0.00005 to about 0.05, emit light at a wave length of from about 650 to about 750 nanometers when excited by long wave length ultraviolet light. The above phosphors are prepared by heating the desired decomposable alkaline earth metal salt, a manganese source and tungsten trioxide in air and under controlled temperature conditions.

10 Claims, 6 Drawing Figures

MANGANESE ACTIVATED ALKALINE EARTH TUNGSTATE PHOSPHORS AND METHOD OF PREPARING THE SAME

BACKGROUND OF THE INVENTION

1. Field of the Invention

This invention relates to luminescent compositions. More particularly it relates to manganese-activated alkaline earth tungstate where the atomic ratio of the alkaline earth metal to tungsten is from about 3:1 to about 3.4:1.

2. Prior Art

Lead-activated calcium tungstate, wherein the ratio of Ca to W is about 1, is well known. U.S. Pat. Nos. 2,617,773 and 3,790,494 describe these luminescent materials and modifications thereof. Calcium tungstate at 1:1 ratio without an activator is a well-known X-ray phosphor. Strontium and barium tungstate having a Sr:W or a Ba:W of about 1 have also known blue-emitting phosphors.

While it is known that alkaline earth tungstate compounds having a 3:1 alkaline earth to tungsten ratio exist, heretofore there has been no mention of their capability as luminescence materials.

It is believed that a new host material having an alkaline earth metal to tungsten ratio of from about 3:1 to about 3.4:1 when activated by manganese and excited by long wave ultraviolet light that yields a deep red emission is an advancement in the art.

OBJECTS AND SUMMARY OF THE INVENTION

It is an object of this invention to provide a new class of luminescent materials.

It is a further object of this invention to provide a luminescent material that yields a deep red emission upon being excited by long wave length ultraviolet light.

It is an additional object of this invention to provide a manganese-activated alkaline earth tungstate having a ratio of alkaline earth metal to tungsten of about 3:1.

It is still an other object of this invention to provide a luminescent material of the formula $M_{3+x}WO_{6+x} \cdot y$Mn wherein M is an alkaline earth metal selected from the group consisting of barium, calcium and strontium, $x$ is from 0 to about 0.4 and $y$ is from 0.00005 to about 0.05.

These and other objects are achieved in one aspect of the invention by a luminescent composition having the formula $M_{3+x}WO_{6+x} \cdot y$Mn wherein M is an alkaline earth metal selected from barium, calcium and strontium, $x$ has a value of from 0 to about 0.4 and $y$ has a value of from about 0.00005 to about 0.05.

DETAILS OF PREFERRED EMBODIMENTS

Figure 1:
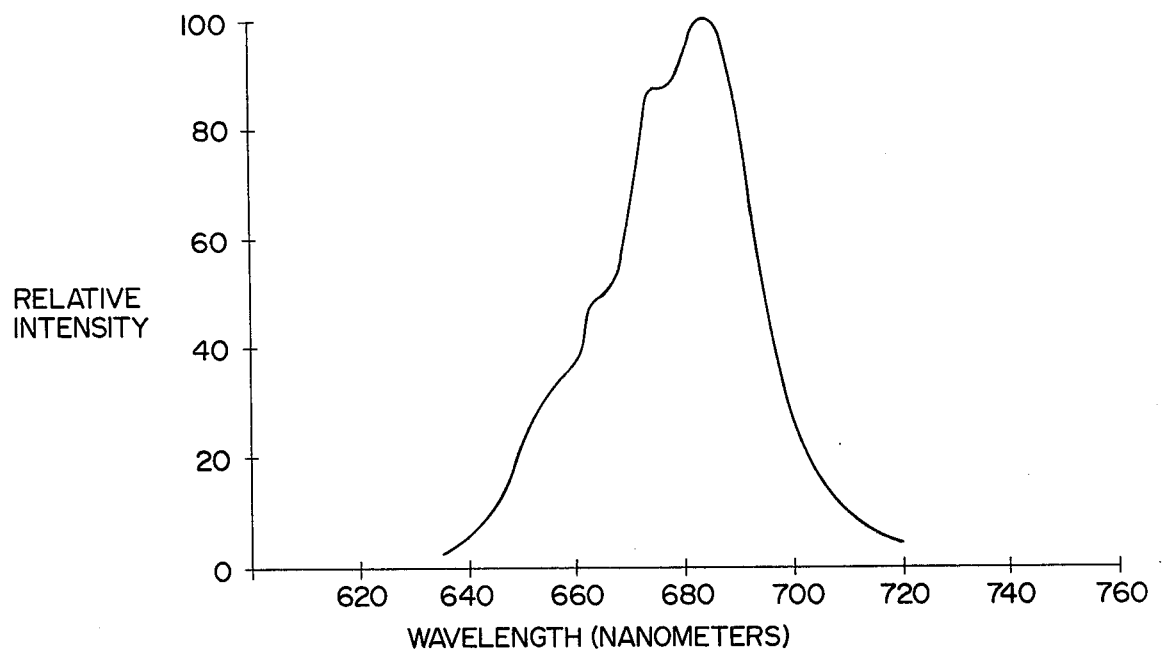
FIG. 1 is an emission spectra and FIG. 4 is an excitation spectra for manganese-activated calcium tungstate material of this invention.

For a better understanding of the present invention, together with other and further objects, advantages and capabilities thereof, reference is made to the following disclosure and appended claims in connection with the above-described drawings.

The luminescent materials of this invention are prepared by solid state reactions. A relatively uniform admixture of the raw materials is prepared then heated under controlled conditions as hereinafter described.

Suitable raw materials for the alkaline earth metals used in the practice of this invention include the decomposable alkaline earth metals compounds. By the term, "decomposable," as used within the context of this disclosure, means a material that is a stable solid at room temperature and upon heating in air to a temperature of about 550° C decomposes to form an alkaline earth metal ion and either a material that is either volatile at the above temperature or a material reacts with oxygen under the above temperature conditions to form a material that evolves from the reaction mass. Alkaline earth metal nitrates are the preferred sources for the alkaline earth metals.

Tungsten trioxide is the preferred source of tungsten although tungstic acid can be used.

Manganese dioxide, $MnO_2$, is the preferred source of the activator. It can be added at any time prior to firing the raw materials. Effective amounts of manganese are from about 0.00005 to about 0.05 moles per mole of host with about 0.001 to about 0.002 moles per mole of host being preferred.

Addition of silicic acid, $SiO_2 \times H_2O$, to yield from about 5 to about 30 mole percent of silica based upon the alkali earth tungstate content increases the brightness of $Ca_3WO_6$: Mn species. A suitable source of silicic acid is sold under the trade name, Cab-O-Sil, by the Cabot Corporation.

The sources of the alkaline earth metal, tungsten and manganese are blended to form a relatively uniform admixture. Thereafter, the admixture is fired in an oxidizing atmosphere at a temperature of from about 600° C to about 1000° C. Air is a suitable oxidizing atmosphere. An oxidizing atmosphere is used to insure that the manganese is at the tetravalent state and that there is sufficient oxygen to react with both the alkaline earth metal and the tungsten. Generally, the time of firing will depend upon the temperature, however, at least 1 hour is required to insure that the compounds having a M:W ratio about 3 (wherein M is the alkaline earth metals useful in the practice of this invention) are formed it is preferred to fire about 1 hour then cool, remix the materials and repeat the firing step.

While the stoichiometric 3:1 compounds yield suitable luminescence, greater than stoichiometric amounts of the alkaline earth metal portion of the host can be utilized, thus the ratio of M to W is the alkaline earth metals mentioned herein can vary from about 3:1 to about 3.4:1. The materials are useful as color correctors in conventional lamps using long wave length ultraviolet radiation as an excitation media.

To more fully illustrate the subject invention the following detailed examples are presented. All parts, proportions and percentages are by weight unless otherwise indicated.

EXAMPLE 1

For test purposes the following material is prepared.

Example 1 (1$WO_3$ 0.01$MnO_2$ Mixture)

The following materials are placed in pebble mill.

|  | Mole Ratio | Parts |
|---|---|---|
| WO$_3$ | 1.00 | 348.00 |
| MnO$_2$ | 0.01 | 1.30 |
| Acetone |  | 240.00 |

The materials are milled for about 16 hours and the acetone is removed, the mixture is then dried and used in the preparation of Examples 2 through 5.

EXAMPLE 2

A batch of the following materials is prepared.

|  | Mole Ratio | Parts |
|---|---|---|
| Ca(NO$_3$)$_2$, Anhydrous | 3.00 | 49.2 |
| 1WO$_3$ — 0.01MnO$_2$ Mix, Example 1 | 0.15 | 3.5 |
| WO$_3$ | 0.85 | 19.7 |

The batch is blended and then fired in air as a thin layer in a silica tray for about 1 hour at about 700° C in an electric box furnace. The tray of material is removed from the furnace and allowed to cool to room temperature, mortared and refired for 1 hour at about 700° C in an electric furnace as a thin layer in a silica tray and then removed from the furnace to cool in air to room temperature. The material of Example 2 is medium textured, has a medium-brown body color, and yields a line-band structure emission peaking at about 670 nm under long-wave ultraviolet excitation. Its X-ray crystal structure is mainly Ca$_3$WO$_6$.

EXAMPLE 3

The following formulation is prepared following the procedure of Example 2.

|  | Mole Ratio | Parts |
|---|---|---|
| Ca(NO$_3$)$_2$, Anhydrous | 3.00 | 49.2 |
| 1WO$_3$ . 0.01MnO$_2$ Mix, Example 1 | 0.15 | 3.5 |
| WO$_3$ | 0.85 | 19.7 |
| *SiO$_2$ X H$_2$O, (assay 93.0% SiO$_2$) | 0.10 | 0.65 |

*Cab-O-Sil M-5 from Cabot Corp.

The material processed by Example 3 procedure is very similar to the Example 2 material except that it has a stronger emission intensity and a lighter body color. The emission spectra of the Example 3 material is shown in FIG. 1.

EXAMPLE 4

The following materials are blended to form a relatively uniform admixture.

|  | Mole Ratio | Parts |
|---|---|---|
| Sr(NO$_3$)$_2$, Anhydrous | 3.35 | 70.9 |
| 1WO$_3$ . 0.01 MnO$_2$ Mix, Example 1 | 0.15 | 3.5 |
| WO$_3$ | 0.85 | 19.7 |

Figure 2:
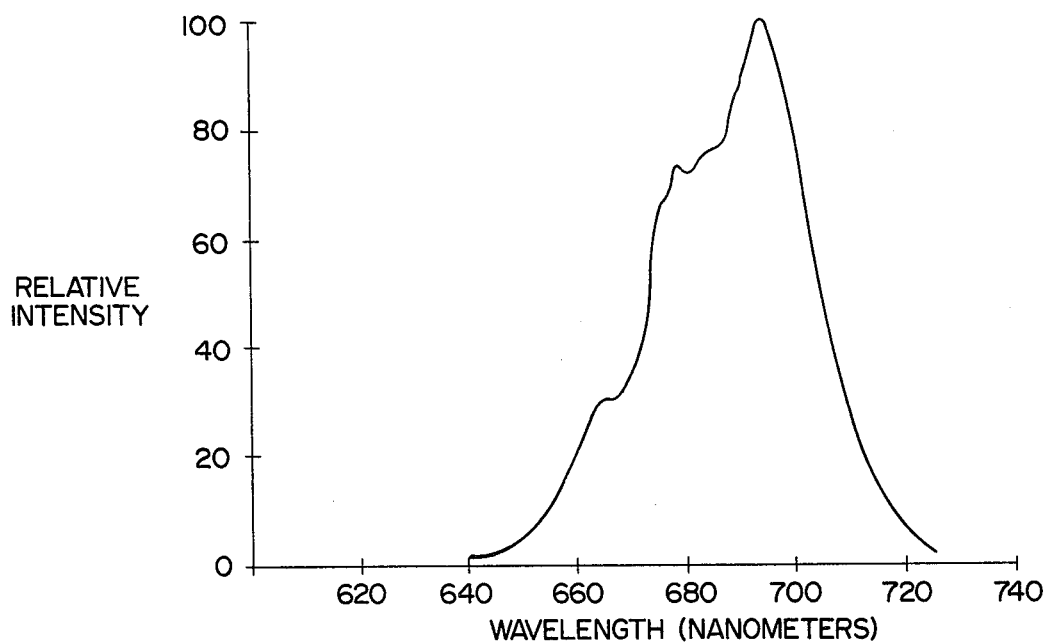
FIG. 2 is an emission spectra and FIG. 5 is an excitation spectra for manganese-activated strontium tungstate material of this invention.

The formulation of this Example is processed as in Example 2 except that final firing temperature is 900° C. Physical and luminescent properties are quite similar to the above described Example 3 material. Its line-band-structure emission peaks at 680 nm. Its X-ray crystal structure was mainly Sr$_3$WO$_6$. The emission spectra is shown in FIG. 2.

EXAMPLE 5

The following formulation is processed as in Example 2.

|  | Mole Ratio | Parts |
|---|---|---|
| Ba(NO$_3$)$_2$, Anhydrous | 3.30 | 17.25 |
| 1WO$_3$ . 0.01 MnO$_2$ Mix, Example 1 | 0.15 | 0.70 |
| WO$_3$ | 0.85 | 3.95 |

Figure 3:
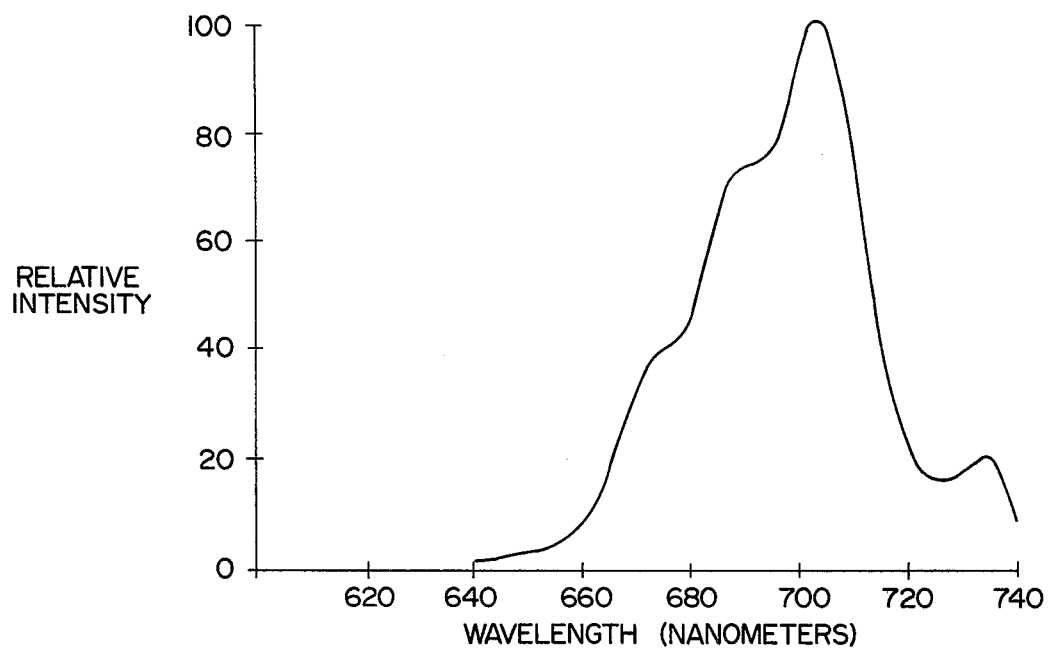
FIG. 3 is an emission spectra and FIG. 6 is an excitation spectra for manganese-activated barium tungstate material of this invention.
Figure 4:
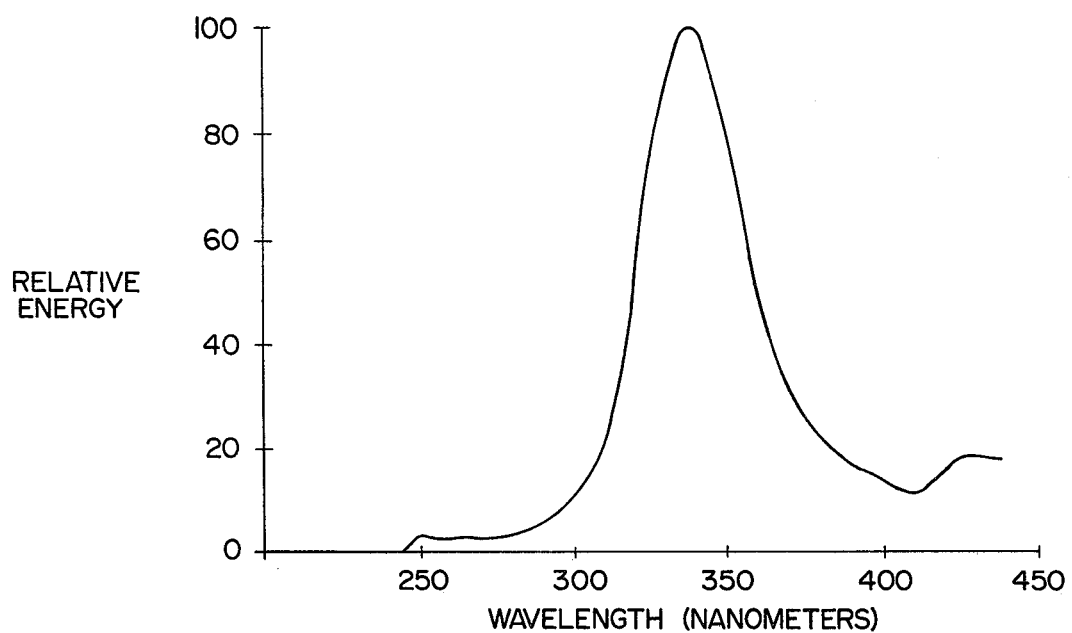
Figure 5:
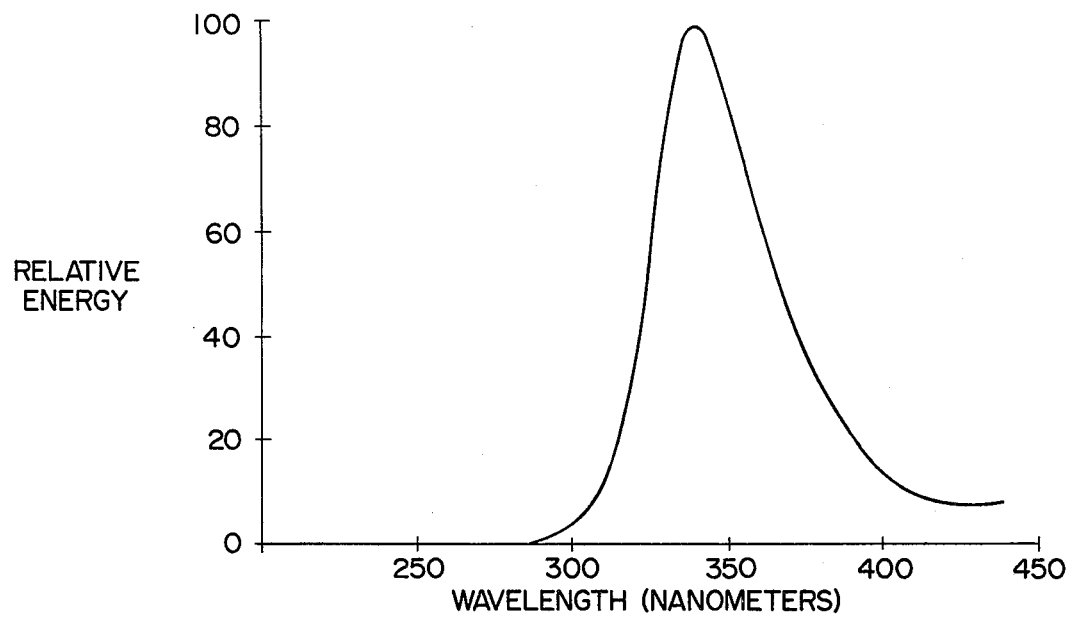
Figure 6:
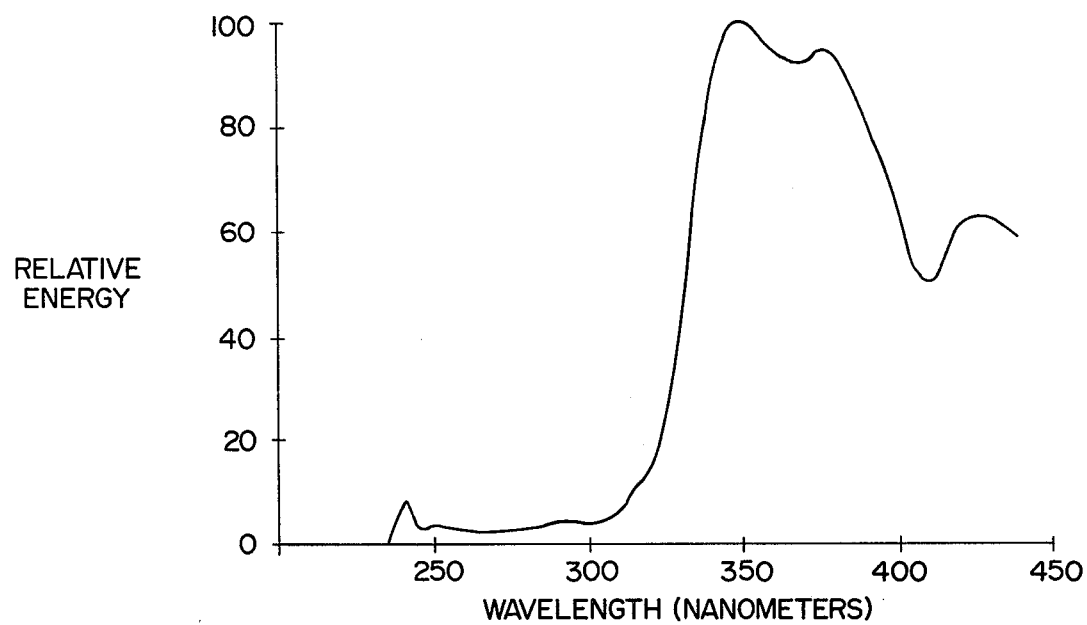

The Example 5 material is quite similar to the Example 3 material described above except at a weaker emission intensity level. A sample prepared similar to Example 5 with Mn omitted is visually nonluminescent. Mn$^{4+}$ clearly activates Ba$_3$WO$_6$ but apparently not as efficiently as it activates Ca$_3$WO$_6$ or Sr$_3$WO$_6$. The emission spectra is shown in FIG. 3.

While there has been shown and described what are at present considered the preferred embodiments of the invention, it will be obvious to those skilled in the art that various changes and modifications may be made therein without departing from the scope of the invention as defined by the appended claims.

What is claimed is:

1. A luminescent composition consisting essentially of a manganese-activated alkaline earth tungstate represented by the formula, $M_{3+x}WO_{6+x} \cdot y$Mn+4, wherein M is an alkaline earth metal selected from barium, calcium and strontium, $x$ has a a value of from 0 to about 0.4, $y$ has a value of from about 0.00005 to about 0.05 said luminescent composition emitting deep red emission when excited by long wave length ultraviolet light.

2. A composition according to claim 1 wherein M is calcium.

3. A composition according to claim 2 containing from about 5 to about 30 mole percent of silica said silica increasing the brightness of the luminescent composition.

4. A composition according to claim 1 wherein M is strontium.

5. A composition according to claim 1 wherein $y$ is from about 0.001 to about 0.002.

6. A process for producing a luminescent manganese-activated alkaline earth tungstate comprising:
  a. forming a relatively uniform admixture of a decomposable alkaline earth metal salt selected from salts of barium, calcium and strontium, a source of tungsten, selected from the group consisting of tungsten trioxide and tungstic acid, a source of tetravalent manganese, wherein in said admixture the atomic ratio of said alkaline earth metal to tungsten is from about 3:1 to about 3.4:1 and said admixture contains from about 0.00005 to about 0.05 moles of manganese per mole of the resulting host calculated on a M$_3$WO$_6$ basis,
  b. heating said admixture at a temperature of from about 600° to about 1000° C in an oxidizing atmosphere for at least about 1.0 hour.

7. A process according to claim 6 wherein said alkaline earth metal salt is selected from alkaline earth metal nitrates.

8. A process according to claim 7 wherein said source of tungsten is tungsten trioxide.

9. A process according to claim 8 wherein said source of tetravalent manganese is manganese dioxide.

10. A process according to claim 9 wherein said alkaline earth metal is strontium or calcium.

* * * * *